United States Patent
Wakamatsu

[15] 3,698,606
[45] Oct. 17, 1972

[54] CONTAINER HAVING QUANTITATIVE MEASURING CHAMBER FOR GRANULAR MATERIAL OR THE LIKE

[72] Inventor: Katsuhiko Wakamatsu, 5-go, 10-ban, 2-chome, Momoi, Suginami-ku, Tokyo-to, Japan

[22] Filed: Oct. 21, 1969

[21] Appl. No.: 868,075

[30] Foreign Application Priority Data

Oct. 29, 1968   Japan ..................... 43/78642

[52] U.S. Cl. ............................ 222/454, 222/457
[51] Int. Cl. ................................. G01f 11/26
[58] Field of Search....222/454, 455, 456, 457, 457.5

[56] References Cited

UNITED STATES PATENTS

| | | |
|---|---|---|
| 3,202,327 | 8/1965 | Haynie ...................... 222/455 |
| 3,221,951 | 12/1965 | Souza ..................... 222/457 X |
| 2,127,417 | 8/1938 | Nelsen ...................... 222/455 |
| 3,090,532 | 5/1963 | Robson ..................... 222/456 |
| 3,235,143 | 2/1966 | Goodrich ................... 222/454 |

Primary Examiner—Robert B. Reeves
Assistant Examiner—Frederick R. Handren
Attorney—Ernest G. Montague

[57] ABSTRACT

There is described a dispensing container particularly suitable for powdery or granular materials, whereby a predetermined amount of the content material may be dispensed at every one tilting operation of the container, such container essentially comprising a measuring chamber defined by an end of a slant wall adapted to flow the content material to said chamber, a part of an external wall of the container and a slant intercepting wall having a predetermined angle with respect to said external wall, with a space being formed between said end of the slant wall and said slant intercepting wall to provide an inlet for the content material to be introduced into said measuring chamber.

7 Claims, 8 Drawing Figures

PATENTED OCT 17 1972

INVENTOR.
Katsuhiko Takamatsu
BY
Attorney

CONTAINER HAVING QUANTITATIVE MEASURING CHAMBER FOR GRANULAR MATERIAL OR THE LIKE

The present invention relates to a container having a quantitative measuring chamber for granular, powdery or other similar material, characterized by providing means which is hygienic and extremely simple in operation and which permits automatic and precise quantitative measurement of the granular, powdery or other similar material contained in the container by simply slanting the container, with no need of using hands or mechanical instruments such as a spoon, and also permits to easily shake out the material from the container, when so desired.

The quantitative measuring chamber in the present invention is preferably formed integrally at an end of the container, but the same effect may be obtained by forming such quantitative measuring chamber portion separately and attaching it to the container body by dovetailing, bonding, elastic holding or other means.

Thus, according to the present invention, there is provided a container having a quantitative measuring chamber for granular material or the like, characterized by forming a quantitative measuring chamber defined by the end of a slant wall adapted to flow the contained material to said chamber, a part of an external wall of the container and a slant intercepting wall having a predetermined angle against said external wall, with a space being formed between said end of the slant wall and said slant intercepting wall to thereby form an inlet for the material, and in which the material in the quantitative measuring chamber is flown out passing along said external wall, there being formed a bent edge at an end of said external wall.

Now, some preferred embodiments of the present invention will be explicated with reference to the accompanying drawings wherein.

and FIGS. 4 to 8 are the illustrations showing the various modes of practice of the container according to the present invention.

Figure 1:
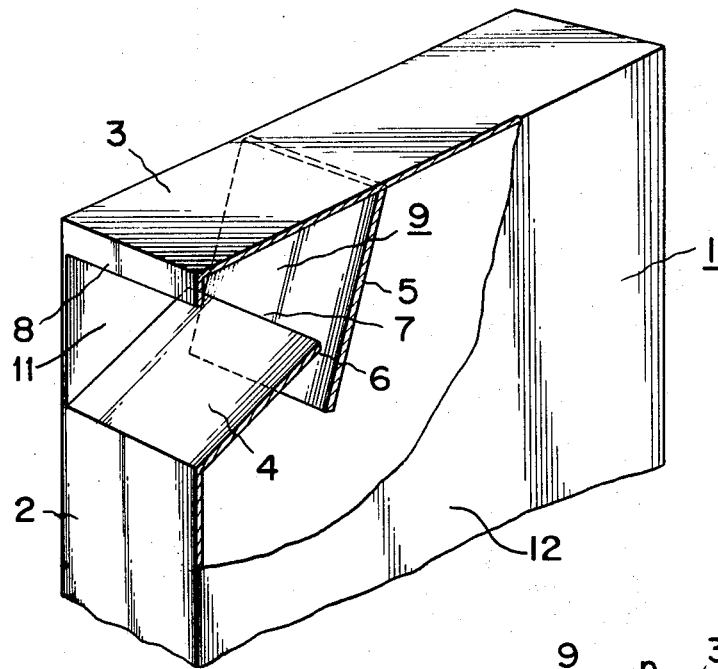
FIG. 1 is a fragmentary perspective view of a first embodiment of the present invention, with the principal part being shown in section.
Figure 2:
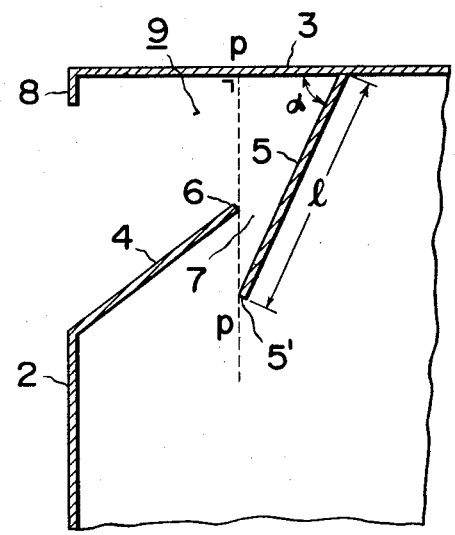
FIG. 2 is a sectional view of the principal part of FIG. 1.
Figure 3:
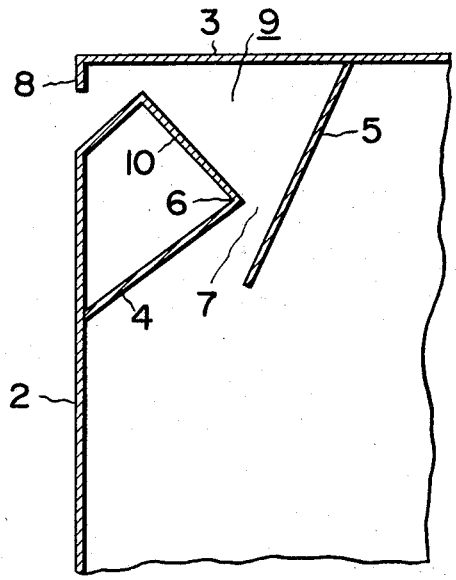
FIG. 3 is a similar sectional view of the principal part of a second embodiment of the container according to the present invention.

Referring now to FIGS. 1 to 3, it will be noted that at the top or bottom end of the container 1 between the side walls 11 and 12 is provided a slant wall 4 adapted to flow the material P from the side external wall 2 toward the end external wall 3.

There is also provided a slant intercepting wall 5 which extends inwardly from said end external wall 3 with a predetermined angle α relative to said external wall.

Between the end 6 of said slant wall 4 and said slant intercepting wall 5 is formed a space which serves as an inlet 7 for the material flow.

It will also be seen that a bent edge 8 is formed at an end of said end external wall 3.

The featured quantitative measuring chamber 9 of the present invention is formed, in a preferred embodiment, by combination of said end external wall 3, an end of said slant wall 4 and said slant intercepting wall 5, but in another embodiment, such as the one shown in FIG. 3, the end 6 of the slant wall 4 may be further extended in bent configuration to form an additional slant wall 10 in said chamber 9, so as to suit the flowing condition of the material P to be discussed later.

The quantitative measuring chamber 9 is designed to have a size which corresponds to the amount of the material P in one supply procedure.

The length $l$ of the slant intercepting wall 5 (FIG. 2) is such that the end 5' of said wall 5 stays on the extension of a vertical line $p-p$ connecting the end 6 of the slant wall 4 and the bottom of the end external wall 3. This length $l$ is the minimum length of the slant intercepting wall 5, such length being suitably elongated according to the flowing condition of the material P to be discussed later.

Although the quantitative measuring chamber is shown located at the upper end of the container in FIG. 1, said chamber may also be located at the lower end of the container, in an inverted condition of FIG. 1, in case a suitable opening-and-closing cover member (not shown) is provided below the bent edge 8 at the end of the end external wall 3.

Also, in this embodiment, the container is shown composed of a rectangular box casing, but obviously, any other suitable configuration, such as triangular or other angular cylinder or circular cylinder, may be used to attain the same effect.

Figure 4:
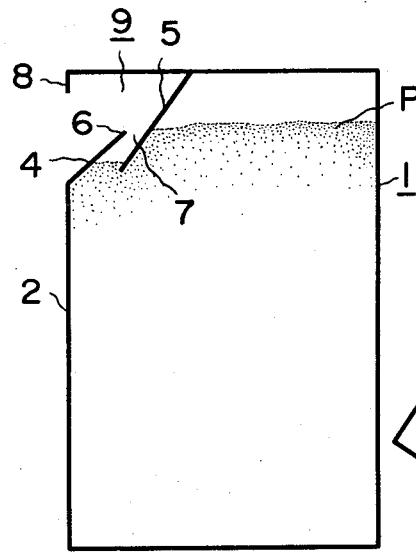
Figure 5:
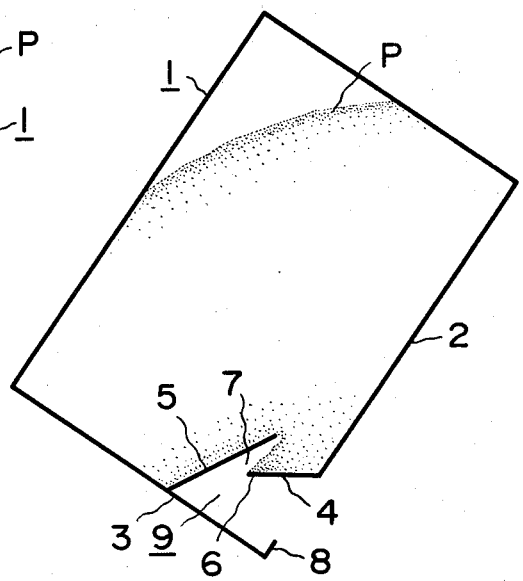
Figure 6:
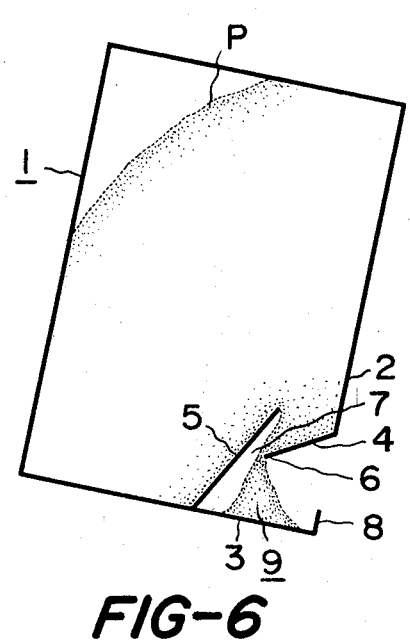
Figure 7:
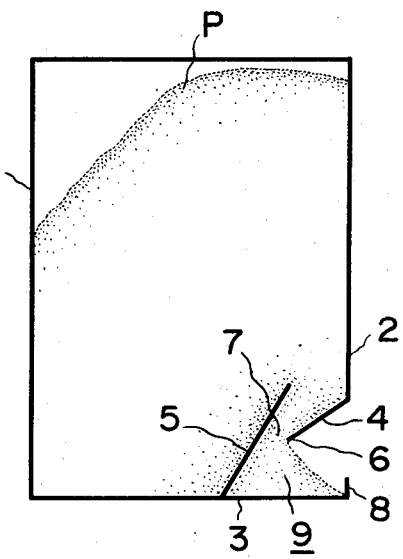

In practice of the container 1 of the present invention having the above-described construction, the container 1 is gradually slanted down until it is finally turned over, whereby the material P, which is first in a condition shown in FIG. 4, is moved successively in the manner shown in FIGS. 5 to 7, to be finally flown into the quantitative measuring chamber 9.

Figure 8:
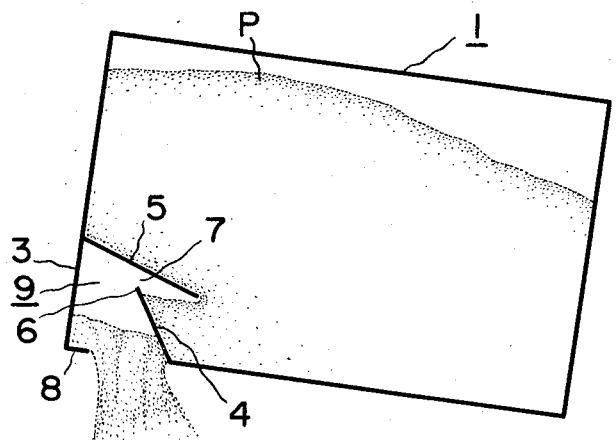

Then, the container 1 is moved from the position shown in FIG. 7 to the position shown in FIG. 8, whereby the material P can be discharged out of the chamber 9.

Discussing the above-described operation in more particular, it is to be noted that in a position where the slant wall 4 lies horizontal as shown in FIG. 5, on the way of movement of the container 1 from the position of FIG. 4 to the inverted position of FIG. 7, the material P is flown onto the slant wall 4 and stays checked or held from running over the brim 6 of the slant wall.

This is due to the facts that strong downward gravity force is working to the material P on the slant wall 4, in contrast with weak force working crosswise, and that the material P on the slant intercepting wall 5 is intercepted from flowing downward by said intercepting wall, thus inhibiting any other force from working to the material P on the slant wall 4.

When the container is further tilted from its position shown in FIG. 5, causing the slant wall 4 to be inclined downward from its horizontal position as shown in FIG. 6, the material P is now flown over the brim 6 of the wall 4, namely the material flows down from the inlet 7, and in a position of FIG. 7 where the container is in a perfectly inverted condition, the material P is freely flown into the quantitative measuring chamber 9 forming a pyramid (or circular cone) of material.

This pyramid or circular cone serves to inhibit further intrusion of the material P from the inlet 7.

It should also be noted that the material P in the quantitative measuring chamber 9 is subject to strong downwardly working gravity force, with only weak force working laterally, and that a bent edge 8 is formed at the end of the end external wall 3, so that the material P is kept from flowing spontaneously out of the chamber 9. Further, the remainder of the material P is intercepted by the slant intercepting wall 5, thus inhibiting generation of any other force, so that said pyramid or circular cone does not collapse at its isolated side.

In the foregoing discussion, the operation of the device was explicated on a step-by-step basis, for the purpose of explanation, from the position of FIG. 5 through the position of FIG. 7, but actually such operation can be effected speedily by substantially a "one touch" practice.

However, if the above operation of the device is treated roughly, such as for example shaking it violently, there is fear of causing collapse of the pyramid, thus inviting fly-out of the material P from the measuring chamber 9 and additional inflow of the material from the slant wall 4.

To eliminate such fear, there may be provided in the quantitative measuring chamber 9 an additional slant wall 10 formed by extending the end 6 of the slant wall 4 and bending it suitably, as in the second embodiment of the present invention shown in FIG. 3, whereby collapse of the pyramid-shaped material P is prevented.

After the material P was measured quantitatively in the chamber 9, the container 1 is then again tilted in such a manner that its discharge opening is faced down, whereby the material P is flown down along the inside of the end external wall 3 or the backside of the slant wall 4 and thus discharged out of the container.

In this case, since the material P on the upper surface of the slant wall 4 rushes back into the container from the brim 6 of the slant wall, and also since the material P above the slant intercepting wall 5 is intercepted thereby from flowing down, no additional material is permitted to flow into the quantitative measuring chamber 9 so that the amount of material supplied from said chamber is always fixed.

In this embodiment, the length $l$ of the slant intercepting wall 5 is defined such that the end 5' of the wall 5 stays on the extension of a vertical line $p$—$p$ drawn from the end 6 of the slant wall vertically to the end external wall 3 as shown in FIG. 2, but this length may be elongated to a suitable extent to attain an effect of intercepting more flowing amount of the material P above the slant intercepting wall 5, and also since a funnel is formed by the slant intercepting wall 5 and the slant wall 4, flow of the material P on the slant wall 4 is expedited.

Thus, according to the container of the present invention having the above-described function, the material which may be contained therein includes granular, powdery or any other similar material which needs to be used in a fixed amount at each use, ranging from such small granular or particle material as coffee, powder milk, sugar, condiments or other various additive foods used in cookery to such larger granular material as cleanser and the like, and such material to be supplied at one tilting operation is automatically measured in the quantitative measuring chamber 9 and is readily supplied from the container by simply tilting it, without causing any spontaneous flyout of the material. Also, there is no need of using hands, so that the apparatus is hygienic. Further, since flow of extra material is inhibited by the slant intercepting wall, the material being measured is prevented from flying out of the container during tilting operation, and also thanks to the configuration of the slant wall or to a funnel formed by said wall, flowing movement of the material in the container is effected smoothly and speedily, and also automatic separation and precise supply of the measured amount of material are assured. While the invention has been described by reference to a specific device, there is no intent to limit the invention to precise details so illustrated, except insofar as set forth in the appended claim.

What is claimed is:

1. A container, comprising
   a quantitative measuring chamber including,
   two container side walls spaced from each other,
   a side external wall disposed between said two container side walls,
   a slant wall connected to said side external wall and extending inwardly and upwardly into said container in the upright position of said container and having an end inside said container,
   an end external wall disposed between said two container side walls and spaced from said side external wall,
   a slant intercepting wall extending, in the upright position of said container between said two container side walls inwardly and downwardly and in a sidewise direction toward said slant wall into said container from said end external wall with a predetermined angle relative to said end external wall, and in part separating said chamber on one side from a storage portion of said container on the other side,
   said end of said slant wall and said slant intercepting wall spaced in non-parallel overlapping relation relative to each other and defining a gradually narrowing inlet for charging material in said container into said quantitative measuring chamber,
   a bent edge constituting a dam at an end of said end external wall spaced from said side external wall, whereby material in the container is charged into said quantitative measuring chamber by flowing along said slant wall when the container is moved to an inverted position and then the material in the quantitative measuring chamber is discharged flowing along said end external wall.

2. The container, as set forth in claim 1, further comprising
   an additional wall formed by an extended end of said slant wall, and
   said extended end being bent defining a predetermined angle relative to said end external wall.

3. The container, as set forth in claim 1, wherein
   said slant intercepting wall is inclined toward said slant wall overlappingly passing beyond said end of said slant wall and terminating thereat in a free end.

4. The container, as set forth in claim 3, wherein
   said slant intercepting wall and said slant wall are spaced from each other and form an obtuse angle relative to each other, and said slant intercepting wall is disposed in its entirety further within said container than said slant wall.

5. The container, as set forth in claim 1, wherein, said bent edge is coplanar with said side external wall and spaced therefrom.

6. A container, comprising
a quantitative measuring chamber including,
two container side walls spaced from each other,
a side external wall disposed between said two container side walls,
a slant wall connected to said side external wall and extending inwardly into said container and having an end inside said container,
an end external wall disposed between said two container side walls and spaced from said side external wall,
a slant intercepting wall extending between said two container side walls inwardly into said container from said end external wall with a predetermined angle relative to said end external wall,
said end of said slant wall and said slant intercepting wall spaced from each other and defining an inlet for charging material in said container into said quantitative measuring chamber,
a bent edge at an end of said end external wall spaced from said side external wall, whereby material in the container is charged into said quantitative measuring chamber by flowing along said slant wall when the container is moved to an inverted position and then the material in the quantitative measuring chamber is discharged flowing along said end external wall,
said slant intercepting wall is inclined toward said slant wall overlappingly passing beyond said end of said slant wall and terminating thereat in a free end,
said free end of said intercepting wall and said end of said slant wall are aligned perpendicularly to said end external wall.

7. The container, as set forth in claim 6, wherein, said side external wall is perpendicular to said end external wall,
said two container side walls are parallel to each other, and
said side external wall has an end from which said slant wall extends and which is spaced from said bent edge.

* * * * *